US007942007B2

(12) United States Patent
Scholz et al.

(10) Patent No.: US 7,942,007 B2
(45) Date of Patent: May 17, 2011

(54) HEAT SHIELD ELEMENT FOR LINING A COMBUSTION CHAMBER WALL, COMBUSTION CHAMBER AND GAS TURBINE

(75) Inventors: Christian Scholz, Mülheim an der Ruhr (DE); Andreas Heilos, Mülheim an der Ruhr (DE); Stefan Hoffmann, Rosenthal (DE)

(73) Assignee: Siemens Aktiengesellschaft, Munich (DE)

( * ) Notice: Subject to any disclaimer, the term of this patent is extended or adjusted under 35 U.S.C. 154(b) by 873 days.

(21) Appl. No.: 11/918,608

(22) PCT Filed: Apr. 18, 2006

(86) PCT No.: PCT/EP2006/061625

§ 371 (c)(1), (2), (4) Date: Oct. 16, 2007

(87) PCT Pub. No.: WO2006/111519

PCT Pub. Date: Oct. 26, 2006

(65) Prior Publication Data

US 2009/0077975 A1 Mar. 26, 2009

(30) Foreign Application Priority Data

Apr. 19, 2005 (EP) .................................... 05008511

(51) Int. Cl.
*F02C 1/00* (2006.01)

(52) U.S. Cl. ........................................... 60/754; 60/752

(58) Field of Classification Search ............. 60/752–760
See application file for complete search history.

(56) References Cited

U.S. PATENT DOCUMENTS

| | | | | |
|---|---|---|---|---|
| 4,835,831 | A | 6/1989 | Melton | |
| 4,840,131 | A | 6/1989 | Meumann et al. | |
| 5,431,020 | A * | 7/1995 | Maghon | 60/753 |
| 5,535,585 | A * | 7/1996 | Eichhorn | 60/799 |
| 5,804,306 | A * | 9/1998 | Sorenson et al. | 428/297.4 |
| 6,047,552 | A * | 4/2000 | Gross et al. | 60/752 |
| 6,711,899 | B2 * | 3/2004 | Bast et al. | 60/752 |
| 6,832,484 | B2 * | 12/2004 | Hofmann et al. | 60/752 |
| 6,840,047 | B2 * | 1/2005 | Schmahl et al. | 60/753 |
| 2002/0182058 | A1 * | 12/2002 | Darnell et al. | 415/115 |
| 2003/0172856 | A1 * | 9/2003 | Hofmann et al. | 110/338 |
| 2003/0177770 | A1 * | 9/2003 | Hofmann et al. | 60/753 |
| 2004/0083735 | A1 * | 5/2004 | Borns et al. | 60/772 |
| 2009/0056339 | A1 * | 3/2009 | Fischer et al. | 60/752 |

FOREIGN PATENT DOCUMENTS

| | | | |
|---|---|---|---|
| DE | 28 31 151 | A1 | 1/1980 |
| DE | 83 21 679 | U1 | 12/1983 |
| EP | 0 419 487 | B1 | 4/1991 |
| EP | 0 724 116 | A2 | 7/1996 |
| EP | 1 128 131 | A1 | 8/2001 |
| WO | WO 99/47874 | A1 | 9/1999 |

* cited by examiner

*Primary Examiner* — Michael Cuff
*Assistant Examiner* — Gerald L Sung

(57) ABSTRACT

The invention relates to a heat shield element for lining a combustion chamber wall, to a combustion chamber and to a gas turbine. The heat shield element comprises a hot side that can be exposed to a hot medium, a wall side opposite said hot side, and a peripheral side adjoining the hot side and the wall side and having a peripheral side surface. Relief slots are introduced into the material in an area of the heat shield element that is susceptible to material cracks induced by thermal stress, thereby limiting crack propagation.

10 Claims, 2 Drawing Sheets

HEAT SHIELD ELEMENT FOR LINING A COMBUSTION CHAMBER WALL, COMBUSTION CHAMBER AND GAS TURBINE

CROSS REFERENCE TO RELATED APPLICATIONS

This application is the US National Stage of International Application No. PCT/EP2006/061625, filed Apr. 18, 2006 and claims the benefit thereof. The International Application claims the benefits of European application No. 05008511.7 filed Apr. 19, 2005, both of the applications are incorporated by reference herein in their entirety.

FIELD OF INVENTION

The invention relates to a heat shield block, in particular for lining a combustion chamber wall, with a hot side that can be exposed to a hot medium, a wall side opposite the hot side and a peripheral side adjoining the hot side and the wall side. The invention also relates to a combustion chamber with a combustion chamber wall and to a gas turbine.

BACKGROUND OF THE INVENTION

A combustion space with a high level of thermal and/or thermo-mechanical loading such as for example a furnace, a hot gas duct or a combustion chamber in a gas turbine, in which space a hot medium is produced and/or ducted, is provided with a suitable lining as protection against excessive thermal stressing. The lining usually consists of a heat-resistant material and protects a wall of the combustion space from direct contact with the hot medium and the high level of thermal loading associated therewith.

U.S. Pat. No. 4,840,131 relates to a securing of ceramic lining elements to a wall of a furnace. Here a system of rails secured to the wall and having a plurality of ceramic rail elements is provided. The rail system allows the lining elements to be supported on the wall. Further ceramic elements can be provided between a lining element and the wall of the furnace, including a layer of loose, partially compressed ceramic fibers, this layer having at least roughly the same thickness as the ceramic lining elements or a greater thickness. The lining elements here are rectangular in shape with a planar surface and consist of a heat-insulating, fireproof, ceramic fibrous material.

U.S. Pat. No. 4,835,831 relates likewise to the affixing of a fireproof lining to a furnace wall, in particular a vertically disposed wall. A layer consisting of glass, ceramic, or mineral fibers is affixed to the metal wall of the furnace. Said layer is affixed to the wall by means of metal brackets or by adhesive means. Wire netting having honeycomb type mesh is affixed to said layer. The meshed netting serves also to prevent the ceramic-fiber layer from dropping down. An even, closed surface of fireproof material is additionally applied to the layer thus secured by means of a suitable spraying method. The described method largely prevents the rebounding of fireproof particles formed during spraying, as would occur were the fireproof particles sprayed onto the metal wall directly.

A ceramic lining of the walls of thermally highly stressed combustion spaces, for example of gas turbine combustion chambers, is described in EP 0 724 116 A2. The lining consists of wall elements made of high-temperature resistant structural ceramic material, such as silicon carbide (SiC) or silicon nitride ($Si_3N_4$) for example. The wall elements are secured mechanically by means of a central securing bolt and resiliently to a metal support structure (wall) of the combustion chamber. A thick thermal insulation layer is provided between the wall element and the wall of the combustion space, so that the wall element is correspondingly distanced from the wall of the combustion chamber. The insulation layer, which is about three times as thick as the wall element, consists of a ceramic fibrous material prefabricated in blocks. The dimensions and external shape of the wall elements can be tailored to the geometry of the space to be lined.

Another kind of lining for a combustion space with a high level of thermal loading is described in EP 0 419 487 B1. The lining consists of heat shield elements secured mechanically to a metal wall of the combustion space. The heat shield elements are in direct contact with the metal wall. To avoid excessive heating of the wall resulting for example from a direct transfer of heat from the heat shield element or the ingress of hot medium into the gaps formed by the mutually adjacent heat shield elements, the space formed by the wall of the combustion space and the heat shield element is exposed to cooling air, so-called barrier air. The barrier air prevents hot medium from penetrating as far as the wall and simultaneously cools the wall and the heat shield element.

WO 99/47874 relates to a wall segment for a combustion space and to a combustion space of a gas turbine. Described therein is a wall segment for a combustion space, which can be exposed to a hot fluid, for example a hot gas, having a metal support structure and a heat protection element secured to the metal support structure. A deformable separating layer is inserted between the metal support structure and the heat protection element, its purpose being to absorb and compensate to a significant degree for possible relative movements of the heat protection element and the support structure. Such relative movements can be caused for example in the combustion chamber of a gas turbine, in particular an annular combustion chamber, by the materials used having different thermal expansion responses or by pulsations in the combustion space that can occur in the event of irregular combustion to produce the hot working medium or as a result of resonant effects. At the same time the separating layer causes the relatively inelastic heat protection element generally to lie flatter on the separating layer and metal support structure, since the heat protection element penetrates partially into the separating layer. The separating layer can thus also compensate for irregularities resulting during production on the support structure and/or heat protection element, which can result locally in an unfavorable force input.

If the surface of a heat shield element is suddenly exposed to a hot medium, for example a hot gas from a combustion system, its temperature rises rapidly in a short time. The resulting relative thermal expansions produce thermally induced stresses, which can lead either immediately or after a certain number of stress or load cycles to cracks occurring in the material of the heat shield element, as a result of which the heat shield element may fail. Depending on the presence of other loads, such as vibrations or chemical effects, the effect of the damage can be further reinforced, so that the useful life of the heat shield element is limited by crack formation. Heat shield elements must therefore, particularly in combustion chambers of gas turbine installations, be examined regularly for cracks with reports being produced and must be replaced at regular intervals to ensure operational safety.

The invention is based on the observation that ceramic heat shield elements in particular, due to their necessary flexibility in respect of thermal expansion, are frequently only protected inadequately from the thermo-mechanical loading that occurs, in particular due to temperature change loading.

SUMMARY OF INVENTION

Based on this problem, the object of the invention is to specify a heat shield element with a longer useful life, in particular in relation to thermo-mechanical loading. A further object of the invention is to specify a combustion chamber with a long useful life as well as a gas turbine with a combustion chamber.

The object relating to the heat shield element is achieved according to the invention by a heat shield element, in particular for lining a combustion chamber wall, with a hot side that can be exposed to a hot medium, a wall side opposite the hot side and a peripheral side adjoining the hot side and the wall side, the peripheral side having a peripheral side surface, and with the peripheral side having an end face and a securing face inclined in relation to the end face, with relief slots being introduced specifically in the material in an area that is susceptible to material crack formation induced by thermal stress, with the relief slots extending into the peripheral side surface and with a plurality of relief slots having a triangular sectional surface.

The invention is already based on the knowledge that because of the thermal expansion characteristics typical of the material and the temperature differences typically occurring during operation (ambient temperature during shutdown, maximum temperature at full load) sufficient thermal movement capacity of heat shield elements, in particular in gas turbine combustion chambers, must be ensured due to temperature-dependent expansion, so that no component-destroying thermal stresses occur due to expansion being impeded. This can be achieved in the known manner, in that the wall to be protected from the action of the hot gas is lined by a plurality of individual heat shield elements of limited size, for example a combustion chamber wall of a gas turbine combustion chamber. Expansion gaps are provided here between the individual ceramic heat shield elements, their design being such that they may never be completely closed even in the hot state for safety reasons. It must be ensured in this process that no hot gas penetrates into the expansion gaps, because otherwise the support elements or wall structure are heated excessively. The simplest and surest way of preventing this in a gas turbine for example is to flush the expansion gaps with air. The peripheral side has a peripheral side surface, with relief slots extending into the peripheral side surface. The extremely high temperatures at the hot side surface mean that crack formation is most likely to occur there. However there are also high temperatures at the peripheral side surface of the heat shield element and it cannot be excluded that cracks may occur there as at the hot side surface. It is therefore particularly advantageous to introduce relief slots on the peripheral side surface too, particularly in the part of the peripheral side surface, which adjoins the hot side and is therefore warmer than the part of the peripheral side surface, which is closer to the cooled wall side.

The invention now pursues a completely new way of reducing life-limiting crack formation, which manifests itself during operation of the heat shield element, thereby significantly increasing the useful life of the heat shield element. This is achieved by introducing relief slots specifically in the material in the area of the heat shield element that is susceptible to material crack formation induced by thermal stress, thereby limiting crack propagation. A micro-crack that has formed in a critical area can then only grow to a limited degree, as its propagation is stopped, as soon as the crack reaches a relief slot. This allows the length of material cracks to be limited to a degree, which is non-critical for the further deployment of the heat shield element. This measure advantageously extends the life of the heat shield element directly, so that correspondingly longer operating times are achieved.

As far as determining the area that is particularly susceptible to material crack formation induced by thermal stress is concerned, the three-dimensional temperature distribution within the heat shield block should be investigated during loading, in other words when the hot side is exposed to a hot medium, for example a hot gas, and when the heat shield element is cooled in the normal manner from the wall side using a cooling fluid, for example cooling air. Investigations on heat shield elements in relation to the invention have shown for example that a three-dimensional temperature distribution is established within the heat shield element due to the cooling air flow at the edges and the action of the hot gas on the hot side of the heat shield element (heat shield surface). This temperature distribution is characterized by a temperature drop from the hot side to the wall side and from central points within the heat shield element to the cooler areas on the peripheral side due to cooling. In the case of heat shield elements, which are typically flat parallel to the wall side, wherein the hot side is inclined in relation to the peripheral side, thereby forming an edge, edge cooling means that the edge areas are cooler than the central areas of the hot side. In the case of these heat shield elements, which are typically flat parallel to the wall side, the temperature gradient perpendicular to the hot side surface results in only comparatively minor thermal stresses, as long as the required arching is not impeded for the heat shield element in the assembled state.

In contrast a temperature gradient parallel to the hot side or wall side—going from the peripheral side to the inside of the heat shield element—easily results in increased thermal stresses, which are particularly marked in the critical areas, owing to the rigidity of plate-like geometries in respect of deformations parallel to their greatest projection surface. Owing to their comparatively low thermal expansion, relatively cool areas, for example the edges, are hereby subjected to thermally induced tensile stress by the hotter central areas, which undergo greater thermal expansion; this can lead to the formation of cracks, preferably starting at the edges of the heat shield block, if the strength of the material is exceeded. Crack formation, induced by thermal stress, can only continue here up to a specific crack length, which is a function of the temperature profile. The occurrence of a crack results in total relaxation of the stress. Short thermal cracks have no perceptible influence on the residual bearing capacity of the heat shield element in respect of the action of mechanical forces. If cracks longer than a critical length occur however, the mechanical bearing capacity of the heat shield element is significantly reduced and there is an acute risk of failure. The heat shield element of the invention allows the formation of long cracks in the material induced by thermal stress to be prevented, by providing relief slots specifically in the material in the areas that are susceptible to material crack formation induced by thermal stress, thereby limiting or stopping crack propagation.

The peripheral side has an end face and a securing face inclined in relation to the end face, with a plurality of relief slots being provided on opposing end faces. Since it is most important that a high level of mechanical stability of the securing side is ensured, it is sensible that no relief slots should be introduced on its surface but that only the end face is provided with such relief slots. This effectively suppresses material weakening due to crack formation, without impairing the mechanical stability of the securing faces.

The relief slots have a triangular sectional surface. It is advantageous here, if these relief slots with triangular sectional surfaces are introduced at the edges of the heat shield element. The depth of the relief slots, measured along the peripheral side, can hereby extend to the edge between the peripheral side and the wall side, so that in this instance the depth of the relief slot is equal to the height of the heat shield element. It is however more advantageous for the relief slots not to extend so far along the peripheral side but for their depth to be smaller than the height of the heat shield element.

It is hereby preferable for the number, material distance, arrangement and geometry of the relief slots to be specified such that the mechanical bearing capacity of the heat shield element is only impaired to an insignificant degree by the relief slots themselves. The introduction of a number of relatively short relief slots allows the thermal stress to be relaxed in the same way as also occurs in a similar manner due to the operationally induced formation of one or a few cracks induced by thermal stress. Of major importance for the residual bearing capacity of the heat shield element ultimately is the maximum crack or slot length of the relief slots. In this instance a number of short relief slots are more favorable than one longer crack. The cross-sectional form of the relief slot can preferably be adjusted specifically so that maximum stress relaxation is achieved for a minimum reduction in the bearing capacity of the heat shield element. This solution can hereby advantageously be deployed in many instances, where expansion gradients from a peripheral side into the inside of a component result from a material due to chemical or physical effects. Instead of allowing cracks induced by thermal stress to occur and propagate in an uncontrolled manner, relief slots are introduced specifically with a defined depth and geometry and at defined distances from each other.

In a particularly preferred embodiment of the invention the hot side has a hot side surface, with relief slots extending into the hot side surface. Investigations have shown that crack formation and crack growth is particularly marked in the area of the hot side surface due to the high temperature of the hot medium. Therefore the weakening of the material due to crack formation and crack growth, which has a detrimental effect on the mechanical bearing capacity of the heat shield element, is particularly serious and life-shortening in areas or sub-areas of the hot side surface. The crack formation effects on the hot side surface therefore contribute significantly to the weakening of the mechanical bearing capacity of the heat shield element in the relevant instance of deployment. The material can hereby be weakened to such an extent that the material becomes detached from the hot side surface in areas of high crack density and long crack lengths or is increasingly eroded as a result of exposure to the hot flowing medium. It is therefore particularly advantageous, if the relief slots extend into the hot side surface. This stops crack growth in the particularly critical areas of the hot side surface and ensures stress relaxation. Further weakening of the material is therefore prevented.

As part of the lining of a combustion chamber wall, the object of a heat shield element is to protect the support elements and wall structure from the high heat inside the combustion chamber. To achieve this object, the heat shield element must have a certain minimum height (thickness) for a predetermined thermal conductivity of the material. Introducing relief slots in the material reduces the effective material height of the heat shield element locally at some points. This secondary effect of the relief slots must be taken into consideration when designing the heat shield element. The problem can be eliminated in two ways. On the one hand an allowance can be factored in when designing the height of the heat shield element. However the better method is to design the height of the relief slots to be so small compared with the height of the heat shield element that the change in the overall height of the heat shield element is not or is barely necessary and the thermal insulation effect of the combustion chamber lining is therefore not significantly impaired.

The relief slots preferably extend from the hot side into the peripheral side, with the depth of the relief slots measured along the peripheral side being smaller than the height of the heat shield element defined by the distance between the hot side and the wall side. This is a particularly favorable refinement of the relief slots, as it means that protective measures are provided along the height of the heat shield element in proportion to the degree of risk. So that the mechanical stability and high temperature insulation characteristics of the heat shield element are not impaired, only the areas, which are susceptible to material crack formation induced by thermal stress, are provided with relief slots. These are the areas on the hot side in proximity to the edges and the areas on the peripheral side which adjoin the hot side surface and are also close to the edges. There is a gradual reduction in slot length here in the direction of the temperature drop from the hot side to the wall side, with a triangular sectional surface of the relief slot being formed.

Relief slots are preferably provided, which extend from the hot side to the wall side, with the slot length measured along the hot side being greater than the slot length along the wall side. The different in the length of the relief slots along the hot side and along the cold side is required because of the respective temperature gradient. On the hot side, where the risk of crack formation is greater, longer relief slots are particularly effective. On the other hand, on the cooler wall side the mechanical stability and thermal insulation effect of the heat shield element are of primary importance. Therefore a much shorter section length suffices on the cooler wall side. There is also a gradual reduction in slot length in the direction of the temperature drop in this embodiment.

It is also advantageous that the peripheral side has an end face and a securing face inclined in relation to the end face and having a securing groove, which is configured to receive a securing element. The securing element can be a bracket, hook or bolt that engages in the groove. The securing element can therefore be positioned directly on the support structure in the combustion space and the risk of fluid flowing below is avoided. It is particularly advantageous to configure the securing means in a detachable manner, thereby allowing the heat shield element to be supported in a resilient manner.

The heat shield element is preferably made of a ceramic material, in particular a fireproof ceramic. Because of their material characteristics, such as high mechanical strength, high permissible deployment temperature, stability of form, corrosion resistance, wear resistance and low thermal conductivity, fireproof ceramic materials are particularly suitable for use as thermal insulators at very high temperatures and temperature gradients, as for example in a combustion chamber.

The object relating to a combustion chamber is achieved according to the invention by a combustion chamber with an inner combustion chamber lining, having heat shield elements as set out above.

The object relating to a gas turbine is achieved according to the invention by a gas turbine with a combustion chamber having such heat shield elements.

BRIEF DESCRIPTION OF THE DRAWINGS

The invention is described in more detail by way of example with reference to the drawings, which are schematic and simplified to some degree, in which.

DETAILED DESCRIPTION OF INVENTION

Figure 1:
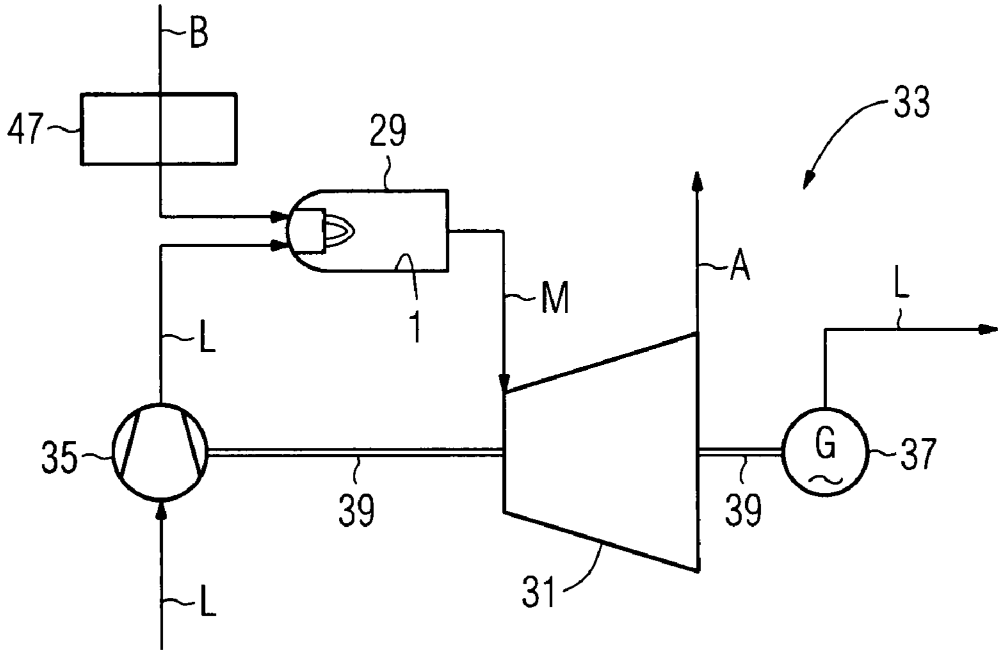
FIG. 1 shows a schematic diagram of a gas turbine installation.

FIG. 1 shows a schematic diagram of a gas turbine installation 33. It comprises a combustion chamber 29 with a fuel supply system 47 and the air compressor 35, gas turbine 31 and electric generator 37 disposed along one axis 39. Ambient air L is drawn in by the air compressor 35, compressed and then supplied to the combustion chamber 29, where it is mixed with the fuel B and combusted, as a result of which a hot gas M is formed. The combustion chamber 29 is fitted with a heat-resistant combustion chamber lining, formed from a number of heat shield elements 1 disposed adjacent to each other and providing cover. The gas turbine is driven by the hot gas M, which leaves the combustion chamber 29 at high pressure. The hot medium M thereby flows through and drives the gas turbine 31 and escapes as waste gas A. The waste gas A is filtered in a filter system (not shown in detail in this figure) and released into the atmosphere after the filtering process. A generator 37 is coupled to the gas turbine 31 and serves to generate electrical energy. The generator 37 is connected to an electricity network and feeds the electrical energy generated by the generator 37 into said network.

Figure 2:
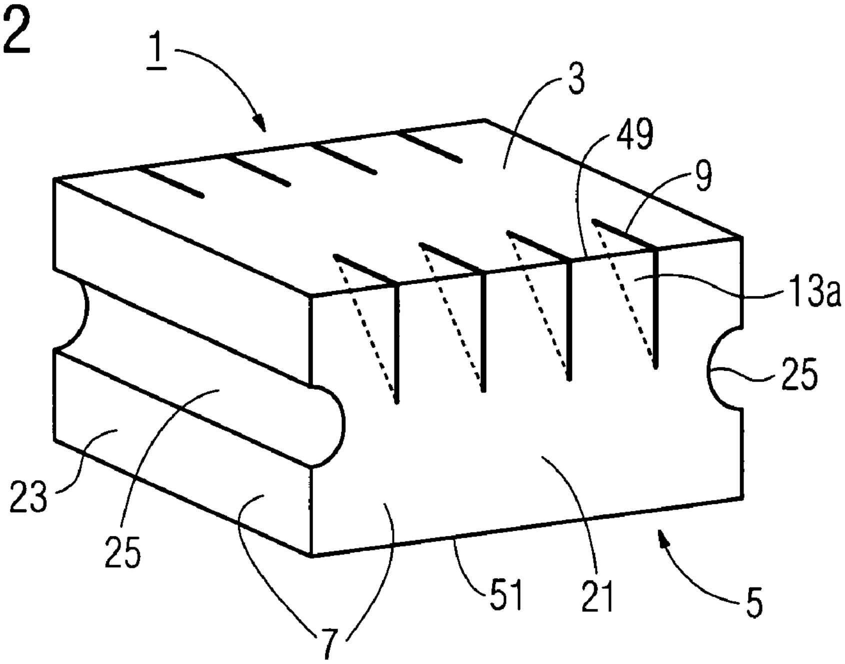
FIG. 2 shows a perspective view of a heat shield element according to the invention.

FIG. 2 shows a perspective view of a heat shield element 1, which is part of the lining of the combustion chamber 29 in FIG. 1. The heat shield element 1 in this refinement is cuboid, in particular with an almost square base surface. The heat shield element has a hot side 3, a wall side 5 (not shown in detail in this figure) opposite the hot side 3 and a peripheral side 7 adjoining the hot side 3 and the wall side 5. The peripheral side 7 is made up of two end faces 21 and two securing faces 23. Each of the opposing securing faces 23 has a securing groove 25. The function of the securing groove 25 is described in detail in FIG. 8. The hot side 3 has a plurality of relief slots 9, which extend into the end face 21. The relief slots 9 in this embodiment do not reach the wall side 5 and have a triangular sectional surface 13*a*. The edge 49 formed by the hot side 3 and the end face 21 is therefore slotted with a number of almost equidistant relief slots 9.

Figure 3:
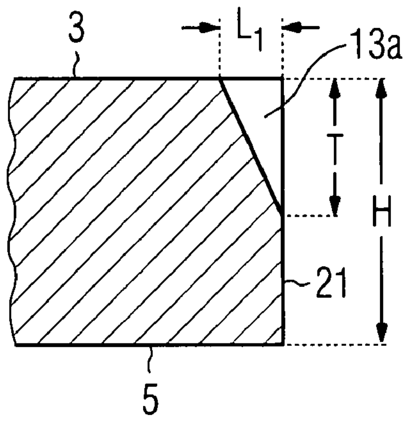
FIG. 3 shows a longitudinal section through part of a heat shield element with the relief slot extending from the hot side into the peripheral side.
Figure 4:
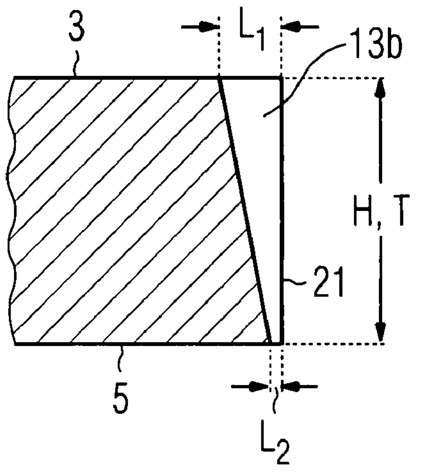
FIG. 4 shows a longitudinal section through part of a heat shield element with the relief slot extending from the hot side to the wall side.

FIGS. 3 and 4 show different embodiments of a relief slot 9. A longitudinal section through part of a heat shield element 1 with height H is shown in these figures. The upper edge represents a section through the hot side 3 and the lower edge through the wall side 5. Both figures also show a section through the end face 21. A relief slot 9 extends into the hot side surfaces 3, having a slot length $L_1$ measured along the hot side. In FIG. 4 the relief slot 9 has a depth T, the measurement of the depth T being smaller than the measurement of the height H of the heat shield element 1. This means that the relief slot 9 extends into the end face 21, without reaching the wall side 5, for example here around 50% of the height H corresponds to the depth T of the relief slot. The relief slot 9 therefore has a triangular sectional surface 13*a*. In contrast to the embodiment in FIG. 4, in FIG. 5 the relief slot 9 reaches the wall side 5 and extends up to a length $L_2$ into the wall side 5. The relief slot 9 therefore has a trapezoidal sectional surface 13*b*. So that the more vulnerable areas are better protected against crack formation, it is important when designing the heat shield element 1 for the slot length $L_1$ measured along the hot side 3 to be greater than the slot length $L_2$ measured along the wall side 5. This is because the risk of crack formation is much higher on the hot side 3 than on the cooler wall side 5.

Figure 5:
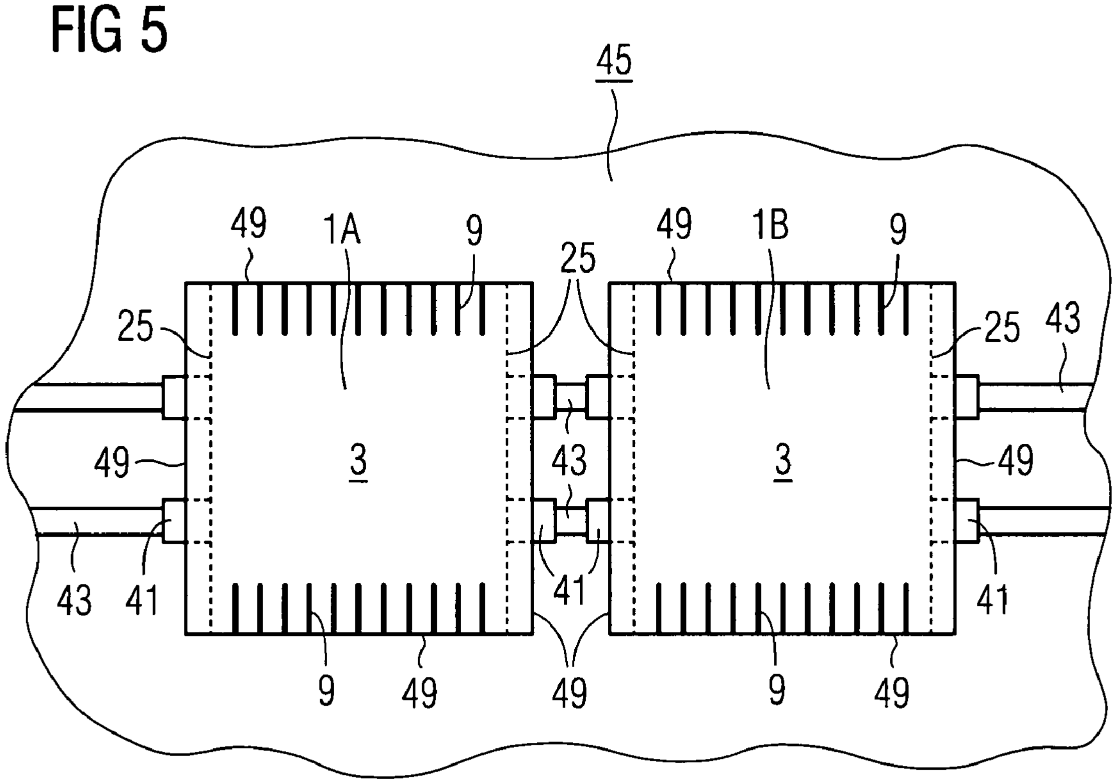
FIG. 5 shows a support structure with heat shield elements secured thereto.

FIG. 5 shows a support structure 45 with heat shield elements 1*a* and 1*b* secured thereto. It shows a top view of the hot sides 3 of the heat shield elements 1*a* and 1*b*. The hot sides 3 are bounded by the edges 49. A number of almost equidistant relief slots 9 is introduced on two opposing edges 49, as shown in FIG. 2. The projection of the securing grooves 25 is shown along the other two opposing edges 49. The heat elements 1*a* and 1*b* are attached adjacent to each other on the support structure 45. Securing elements 41 are used for securing purposes, engaging in the respective securing groove 25 of the heat shield elements 1*a* and 1*b*. The support structure 45 also has a securing groove 43, milled out of the support structure 45 for example. The securing element 25 also engages in the securing groove 43 of the support structure 45 and the heat shield elements 1*a* and 1*b* are thus fixed to the support structure 45.

The invention claimed is:

1. A heat shield element for lining a combustion chamber wall, comprising:
- a hot side exposed to a hot medium,
- a wall side arranged opposite the hot side; and
- a peripheral side that adjoins the hot and wall sides where the peripheral side comprises:
  - opposing end faces, and
  - opposing securing faces where the securing faces adjoin the end faces,
- wherein a plurality of relief slots are formed on opposing end faces in an area of the heat shield element susceptible to thermal stress crack formation, and where the relief slots extend into the peripheral side surface, wherein the plurality of relief slots are triangular shaped.

2. The heat shield element as claimed in claim 1, wherein the number, distance, arrangement and geometry of the relief slots are specified such that the mechanical bearing capacity is impaired to an insignificant degree.

3. The heat shield element as claimed in claim 2, wherein the hot side has a hot side surface, with relief slots extending into the hot side surface.

4. The heat shield element as claimed in claim 3, wherein relief slots extend from the hot side into the peripheral side, with the depth of the relief slots measured along the peripheral side being smaller than the height of the heat shield element defined by the distance between the hot side and the wall side.

5. The heat shield element as claimed in claim 4, wherein the relief slots extend from the hot side to the wall side with the slot length measured along the hot side being greater than the slot length along the wall side.

6. The heat shield element as claimed in claim 5, wherein each securing face has a securing groove configured to receive a securing element.

7. The heat shield element as claimed in claim 6, wherein the heat shield element is formed from a ceramic material.

8. The heat shield element as claimed in claim 7, wherein the ceramic material is a fireproof ceramic.

9. A combustion chamber, comprising:
- a combustion chamber wall that forms an outer boundary of the combustion chamber;
- a plurality of heat shield elements having:

a hot side exposed to a hot medium, a wall side arranged opposite the hot side and facing the combustion chamber wall; and a peripheral side that adjoins the hot and wall sides where the peripheral side comprises:

opposing end faces, and opposing securing faces where the securing faces adjoin the end faces, wherein a plurality of relief slots are formed on opposing end faces in an area of the heat shield element susceptible to thermal stress crack formation, and where the relief slots extend into the peripheral side surface, wherein the plurality of relief slots are triangular shaped.

10. A gas turbine, comprising a compressor that receives and compresses a working fluid;

a combustion chamber that receives the compressed working fluid and produces a hot working fluid, wherein the combustion chamber a combustion chamber wall that forms an outer boundary of the combustion chamber has:

a plurality of heat shield elements having:

a hot side exposed to a hot medium, a wall side arranged opposite the hot side and facing the combustion chamber wall; and a peripheral side that adjoins the hot and wall sides where the peripheral side comprises:

opposing end faces, and opposing securing faces where the securing faces adjoin the end faces, wherein a plurality of relief slots are formed on opposing end faces in an area of the heat shield element susceptible to thermal stress crack formation, and where the relief slots extend into the peripheral side surface, and wherein the plurality of relief slots are triangular shaped; and a turbine that receives and expands the hot working fluid.

* * * * *